(12) United States Patent
Brenneis et al.

(10) Patent No.: US 9,394,815 B2
(45) Date of Patent: Jul. 19, 2016

(54) METHOD AND DEVICE FOR METERING THE ADDITIVE FOR REGENERATING A DIESEL PARTICULATE FILTER

(71) Applicant: MANN+HUMMEL GMBH, Ludwigsburg (DE)

(72) Inventors: Uwe Brenneis, Hockenheim (DE); Andreas Kloss, Mannheim (DE); Martin Schoenung, Landau in der Pfalz (DE); Johannes Kuntz, Deggingen (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/035,091

(22) Filed: Sep. 24, 2013

(65) Prior Publication Data

US 2014/0208944 A1 Jul. 31, 2014

Related U.S. Application Data

(63) Continuation of application No. PCT/EP2012/055243, filed on Mar. 23, 2012.

(30) Foreign Application Priority Data

Mar. 24, 2011 (DE) .................. 10 2011 015 061

(51) Int. Cl.
*B01D 46/46* (2006.01)
*F01N 3/023* (2006.01)
*F01N 9/00* (2006.01)
*F02D 41/02* (2006.01)
*F02M 43/00* (2006.01)
*F02D 41/18* (2006.01)

(52) U.S. Cl.
CPC ................ *F01N 3/023* (2013.01); *F01N 9/002* (2013.01); *F02D 41/029* (2013.01); *F02M 43/00* (2013.01); *F01N 2430/04* (2013.01); *F01N 2610/01* (2013.01); *F02D 41/18* (2013.01); *F02D 2200/0812* (2013.01); *Y02T 10/47* (2013.01)

(58) Field of Classification Search
CPC .......... F01N 2430/04; F01N 2510/065; F02D 41/029; F02D 2200/0812
USPC .......................................................... 95/20
See application file for complete search history.

(56) References Cited

U.S. PATENT DOCUMENTS 7,207,171 B2 * 4/2007 Nagaoka et al. ............... 60/295
2004/0211159 A1 * 10/2004 Hamahata et al. .......... 55/282.3

(Continued)

FOREIGN PATENT DOCUMENTS

| EP | 1170473 A1 | 1/2002 |
| JP | 61135917 A | 6/1986 |
| WO | 03100244 A1 | 12/2003 |

OTHER PUBLICATIONS

Desterdiek et al., WO 2003100244 translation, Method for Operating a Deisel Engine, Dec. 4, 2003, Germany.*

(Continued)

*Primary Examiner* — Amber R Orlando
(74) *Attorney, Agent, or Firm* — James Hasselbeck

(57) ABSTRACT

A method for metering an additive for a regeneration process of a particle filter activated in the exhaust gas system of an internal combustion engine, in particular of a diesel engine, the quantity of the additive to be metered in being calculated from the soot production of the internal combustion engine.

10 Claims, 2 Drawing Sheets

(56) References Cited

U.S. PATENT DOCUMENTS

| | | | |
|---|---|---|---|
| 2007/0000241 A1* | 1/2007 | Funke et al. | 60/295 |
| 2007/0006577 A1* | 1/2007 | Yokoyama et al. | 60/297 |
| 2007/0130923 A1* | 6/2007 | Dye et al. | 60/295 |
| 2007/0204594 A1* | 9/2007 | Ishii | 60/274 |
| 2007/0266701 A1* | 11/2007 | Cheng | 60/295 |
| 2008/0314021 A1* | 12/2008 | Sisken | 60/274 |
| 2009/0082938 A1* | 3/2009 | Onodera et al. | 701/103 |
| 2009/0198402 A1* | 8/2009 | Quigley et al. | 701/29 |
| 2009/0235645 A1* | 9/2009 | Noda | 60/285 |
| 2009/0293453 A1* | 12/2009 | Sujan | 60/285 |
| 2010/0018190 A1* | 1/2010 | Harada et al. | 60/295 |
| 2010/0192546 A1* | 8/2010 | Nohl | 60/286 |
| 2010/0319315 A1* | 12/2010 | Gonze et al. | 60/273 |
| 2011/0146234 A1* | 6/2011 | Rynders et al. | 60/274 |

OTHER PUBLICATIONS

PCT search report of PCT/EP2012/055243, dated Aug. 21, 2012.

* cited by examiner

METHOD AND DEVICE FOR METERING THE ADDITIVE FOR REGENERATING A DIESEL PARTICULATE FILTER

CROSS REFERENCE TO RELATED APPLICATIONS

This application is a continuation application of international application No. PCT/EP2012/055243 having an international filing date of Mar. 23, 2012 and designating the United States of America, the international application claiming a priority date of Mar. 23, 2011, based on prior filed German patent application No. 10 2011 015 061.7, the entire contents of the aforesaid international application and the aforesaid German patent application being incorporated herein by reference.

TECHNICAL FIELD

The invention relates to a method a device for metering an additive for a regeneration process and determining a starting time of a regeneration process of a particle filter activated in the exhaust gas system of an internal combustion engine, in particular of a diesel engine. Moreover, the invention relates to a system for particle filtration for an internal combustion engine, in particular a diesel engine. Furthermore, the invention relates to a method for retrofitting an internal combustion engine, in particular a diesel engine, with a system for particle filtration.

BACKGROUND OF THE INVENTION

As is known from DE 10 2006 033 567 A1, particle filters are activated in the exhaust gas system of diesel engines to reduce the particle emission, in particular a soot emission. When operating a diesel engine, particles collect on the filter surface of the particle filter or in the filter medium thereof. Eliminating the soot by means of a soot burn-off and therefore by oxidation is known method for regenerating such a particle filter. This type of soot burn-off occurs automatically when the exhaust gas temperature flowing against the particle filter is greater than the ignition temperature of the soot. Fuel additives can be used to reduce the soot ignition temperature. Thus, an ignition can also take place by adding these types of additives at a temperature below the soot ignition temperature, but above the soot ignition temperature with additives. The exhaust gas temperature then normally exceeds the soot ignition temperature or said soot ignition temperature with the addition of additives if the diesel engine is operating under a specific load over a specific time period. Active regeneration processes are used in order to make a regeneration of the particle filter possible also in operating states in which the exhaust gas temperature is lower than the soot ignition temperature also with the addition of additives. This is accomplished by supplying thermal energy, for instance via thermoelectric heating elements or by injecting fuel into the exhaust gas stream.

To make it possible for a discontinuous regeneration of the particle filter to occur through soot burn-off, it is necessary for the particle filter to have a specific soot load or to not exceed said load. If the soot quantity accumulated on the particle filter is too low, this can produce an incomplete, uneven soot burn-off, and if the soot quantity is too great, uncontrolled combustion processes and therefore damage may occur. Therefore, the point in time at which regeneration is started is essential for the regulation of a particle filter system. If this takes place too soon, e.g., too frequently, there is not enough material (soot) on the filter for regeneration to proceed completely, in other words, for the entire filter to self-clean. For the filter elements used, there are, e.g., sintered metal filters or even ceramic filter elements, e.g., based on silicon carbide, cordierite or aluminum titanate, and an upper and lower limit for the soot load between which a regeneration takes place optimally. As a result, the soot load must be observed and as soon as the application is in the optimal "soot window", a suitable point in time must be determined for igniting the regeneration.

The correct additive to diesel fuel ratio is also important for the success of a regeneration with a diesel particulate filter. In the prior art, the fuel content in the tank is frequently measured via the tank sensor. The quantity of additive required is calculated with the measured fuel quantity and added to the fuel tank using a metering pump.

Patent EP 1 509 691 B1 describes the start of a regeneration as a function of the soot load on the filter. The pressure difference in the exhaust gas after-treatment system before and after the particle filter is determined as an essential parameter. In addition, a theoretic particle load is calculated and the load state of the particle filter is determined by comparing the theoretic particle load with the particle load measured from the pressure difference, wherein to calculate the theoretic particle load, the exhaust gas temperature minus an assessment threshold is integrated over a predetermined time. An additive is added to the fuel, when the load state of the particle filter has exceeded a specific threshold. The quantity of added additive can come about as a function of the concentration of the additive in the tank.

Patent EP 1 583 892 B1 describes a method for regulating the actuation of a heating apparatus for regenerating a particle filter activated in the exhaust gas system of an internal combustion engine. In the case of this method, the exhaust gas backpressure generated by the particle filter is detected as a measure of the soot load state of the particle filter and the exhaust gas backpressure is measured when the engine is idling and the exhaust gas recirculation is switched off. Then the exhaust gas backpressure signal is compared with a threshold value representing an adequate soot load for triggering a regeneration of the particle filter. The heating apparatus for triggering the regeneration process is enabled when the detected exhaust gas backpressure signal is greater than the threshold value. The disadvantage here is that the exhaust gas backpressure cannot be measured during ongoing normal operation, but only when idling.

A minimum of a two-stage method for determining the starting time of the regeneration process of a particle filter activated in the exhaust gas system of an internal combustion engine is known from patent DE 10 2006 033 567 A1 that was already cited in the foregoing. In this case, first the current soot load state of the particle filter is determined. Said soot load state is compared with a characteristic map constructed of data which represent the soot load required for a regeneration process with adequate regeneration success in the case of different operating states of the internal combustion engine. If the currently determined soot load is greater than or equal to the minimum soot load required by the characteristic map, a "load state OK" flag is set. Once the "load state OK" flag is set, the expected regeneration success for it is determined, if the regeneration process would be triggered at the point in time of the determination as a function of the current operating state of the internal combustion engine. If this regeneration success is adequate, a "start regeneration" flag is set.

A method is known from patent application EP 2 252 780 for determining the load state of a particle filter activated in the exhaust gas system of an internal combustion engine, in particular of a diesel engine, which comprises the following steps: Determining the exhaust gas volume flow in the flow direction of the exhaust gas after the particle filter; Detecting the prevailing pressure in the exhaust gas system in the flow direction of the exhaust gas before the particle filter; Comparing the exhaust gas volume flow determined in the flow direction after the particle filter with the prevailing pressure determined before the particle filter; and evaluating the result of the comparison taking into consideration the exhaust gas backpressure made available by the unloaded particle filter with respect to exhaust gas backpressure producing the particle filter load.

EP 1 736 653 describes the metering of the additive for regenerating a diesel particulate filter as a function of the operating conditions of a motor vehicle.

The addition of an additive for regenerating a diesel particulate filter as a function of the engine load is known from EP 0 488 831.

SUMMARY OF THE INVENTION

To ensure the correct additive concentration in the fuel, the soot production the engine is measured with a control unit. The soot production may be measured and evaluated by the current filter load and via available characteristic maps, which are stored in the control unit. The measured soot quantity can be used to calculate and adjust the correct mixing ratio.

Therefore, according to the invention, a method for metering an additive for a regeneration process of a particle filter activated in the exhaust gas system of an internal combustion engine, in particular of a diesel engine, wherein the quantity of the additive to be metered in is calculated from the soot production of the internal combustion engine.

The soot production of the internal combustion engine is preferably calculated from the filter load.

In the process, the filter load is preferably calculated from the data of an air flow sensor and a differential pressure sensor with the aid of characteristic maps. In one embodiment, the exhaust gas temperature may also be used for calculation.

In one embodiment, the level of success of a regeneration cycle of the diesel particulate filter is determined in order to determine the quantity of additive to meter in. This can be accomplished for example by comparing the differential pressure (or even the pressure loss) prior to the regeneration process with the differential pressure after the regeneration process.

In one embodiment, the level of success determined in this manner is compared to a target level of success. If the pressure loss from regeneration is not decreased to an adequate degree defined for the application and/or the particle filter, an adequate level of success is not achieved. In this case, an additional quantity of the additive is added to the fuel supply. This can be repeated so long until a predetermined, adequate target level of success has been achieved. Once the target level of success is achieved, no additional additive is added to the fuel supply. This step may be repeated in particular regularly after each regeneration process.

In this way, it is possible to add an optimal quantity of the regeneration additive without knowing the current additive concentration in the fuel supply. In addition, it is possible in this way to adjust the additive concentration optimally to a desired level of success without being aware of or having to take into account properties of the internal combustion engine or the design of the exhaust gas system. Because the method according to the invention is able to calculate the correct mixing ratio of additive to fuel, the tank sensor that is normally imprecise is no longer absolutely necessary. This is advantageous in particular for retrofitting solutions, because a connection to the tank sensor is not required for reliable operation and therefore cabling as well as control can be less complex and therefore cheaper. Overall, a more precise metering and therefore also optimized additive consumption can be achieved, in particular in such a way that only the additive quantity which is required to achieve a predetermined level of success is added.

Nevertheless, the signal of a tank sensor is accessed for the method in an advantageous embodiment of the method. This occurs such that the quantity of the fuel recorded during a first fueling process is determined and saved in particular. Furthermore, the additive quantity that was added after this first fueling process until a desired level of success of regeneration was achieved is saved. A ratio between the additive quantity and the fuel quantity (in particular the volume ratio) is calculated from these values. In the case of a further fueling process, the tank quantity of the recorded fuel is determined. Then, in accordance with the previously determined ratio, an additive quantity is added with which the ratio determined after the first fueling process can be produced.

In an advantageous further development, an additive quantity is added after the further fueling process which is not adequate to produce the ratio determined after the first fueling process, but for example only 90% or 95% of this ratio.

Then the steps described above for measuring the level of success and re-metering can be taken to readjust the additive content optimally.

The metering strategy can be combined with a method for determining a starting time of a regeneration process of a particle filter activated in the exhaust gas system of an internal combustion engine, in particular of a diesel engine, wherein the data of an air flow sensor, of an exhaust gas temperature sensor and of a differential pressure sensor are provided to a control unit and this control unit starts the regeneration on the basis of the data by comparing said data with characteristic maps. In the case of a characteristic map, an air flow is preferably allocated a value of a load state of the particle filter, starting at which the air flow can be regenerated. A value of the load state is preferably allocated to a combination of air flow, exhaust gas temperature and differential pressure.

In the case of the method, the engine operation can be detected via the air flow signal. A signal from the engine about the rpm of the engine is not required for this.

In the case of the present invention, the method for metering an additive for regenerating a particle filter activated in the exhaust gas system of an internal combustion engine, in particular of a diesel engine, preferably uses the values of two sensors: the air flow sensor and differential pressure sensor.

In combination with the method for determining a starting time of a regeneration process of a particle filter activated in the exhaust gas system of an internal combustion engine, in particular of a diesel engine, the values of three sensors, specifically the exhaust gas temperature sensor, air flow sensor and differential pressure sensor, and three characteristic maps of exhaust gas temperature, air flow and differential pressure, which were recorded with an unloaded, partially loaded and maximally loaded filter and between which can be interpolated, are preferably used. The soot load on the filter is determined continuously. The measured sensor data are permanently correlated in the software and checked to see whether the regeneration can start.

An exhaust gas temperature sensor upstream from the particle filter is preferably exclusively used during measurement. This reduces the complexity of the system, which is important for retrofitting solutions in particular.

The invention provides for a continuous monitoring of the relevant parameters, which have been permanently correlated with each other. When the overall picture of all monitored parameters permits a regeneration to be triggered, the regeneration process of the particle filter is started. Therefore, this does not constitute a static monitoring, in which first a flag is set and when said flag is set, additional parameters are checked, but a dynamic regulation or control.

One advantage is the permanent monitoring of the parameters that are essential for regeneration and the assessment of the overall situation. Every value is not evaluated individually and compared with an associated value which must be achieved, rather all parameters are permanently checked and correlated with each other and the interaction of all values is checked. As a result, a clearly higher level of flexibility is achieved, when it is a matter of making a decision about the start of regeneration.

The current state of the engine (idling, full load, switched off, etc.) is also important for starting a regeneration. The signal of the air flow sensor is evaluated to determine the operating states of the engine. When the sensor is installed in the machine, it is adapted to the vehicle (idling signal and signal with the highest possible load and rpm) or specified in the control unit. Therefore, the software is able to determine a suitable engine state for regeneration. For example, the value for the load taken from the interpolated characteristic maps, which correspond to the measured values of exhaust gas temperature, air flow and differential pressure, can be compared to a value, which allocates a lower threshold value for the load to a characteristic map of the air flow. Regeneration is started once the value taken for the load is greater than the threshold value for the load.

The invention provides for a direct measurement of the air flow, in particular in the intake tract of the internal combustion engine. Therefore, the method and the device for determining a starting time of a regeneration process of a particle filter activated in the exhaust gas system of an internal combustion engine is independent of the rpm/air flow ratio and can easily be adapted to a vehicle. This is a substantial improvement for the use in retrofitting applications and original equipment applications, in particular in the case of a high level of variant diversity, i.e., when a system is supposed to be able to be utilized with as few modifications as possible in different vehicles, such as e.g., construction vehicles, industrial trucks, etc. Therefore, the invention does not use the rpm signal, but the air flow sensor to detect a favorable point in time for starting regeneration.

In one embodiment, characteristic maps for the relationship between the exhaust gas temperature, air flow and differential pressure in the three load states of a) no load, b) lower threshold for regeneration and c) upper threshold for regeneration, are stored for a diesel particulate filter as a function of its geometry and size. No information about the internal combustion engine is required for this data.

In a preferred embodiment for the respective particle filter, values or curves are provided for the exhaust gas backpressure as a function of the exhaust gas volume flow for three states. The first state is without a load (0 $g/m^2$). The second state is for a load (for example a value in the range of 18-28 $g/m^2$, in particular 20-26 $g/m^2$, preferably 24 $g/m^2$) starting at which a regeneration can be conducted meaningfully. This is in particular the smallest load at which the any soot located in the particle filter burns off completely, after an ignition has taken place in a region of the particle filter.

Ignition can be accomplished for example by after-injecting fuel and therefore increasing the exhaust gas temperature or by providing an energy source, especially an electric one, locally on the particle filter. Electric ignition is possible for example by means of a central glow plug or a radially circumferential heater and takes place preferably on the upstream end of the particle filter, for example circumferentially on the outer edge or centrally in the center of the particle filter.

The third state is a load (for example a value in the range of 28-42 $g/m^2$, in particular 30-38 $g/m^2$, preferably 36 $g/m^2$) starting at which regeneration should no longer be carried out in order to keep from endangering the diesel particulate filter from too high a temperature during regeneration.

Adapted to the internal combustion engine, the relationship between the air flow and load is determined in a preferred embodiment. To do this, the air flow during idling is measured as well as the air flow during full load. This can be conducted once for an internal combustion engine type and be stored in the control unit or be performed on the special internal combustion engine when an internal combustion engine is being retrofitted with a diesel particulate filter system with regeneration.

In one embodiment, the air flow range between idling and full load is then subdivided into a number ranges, e.g., into three or four ranges. These ranges are preferably distributed uniformly over the air flow range between idling and full load. The range between the lower and upper threshold for the regeneration is correspondingly subdivided into many parts, which are allocated to the ranges of the air flow range. In the process, the range of the smallest load is allocated to the range with the greatest air flow rate and vice versa. As a result, a load value of the diesel particulate filter starting at which a regeneration can take place is then allocated to a load of the internal combustion engine via the air flow in the case of this load. During full load or higher air flow, the regeneration is also promising at low loads. In other words, a higher air flow rate is required at low loads for successful regeneration. In the case of higher loads, regeneration is already possible at lower air flows, wherein in the range of the highest load, a regeneration also takes place during idling, i.e., with the lowest air flow rate. The allocation can be made such that a minimum value is provided as the lower regeneration threshold for the air flow for each partial range of the load starting at which regeneration is possible, wherein, in the range of the lowest load, an air flow rate in the highest range is required. In this case, the maximum air flow determined during full load is always used as the upper regeneration threshold for the air flow. Alternatively, a fixed allocation of ranges of the load to ranges of the air flow is provided so that regeneration only takes place at high load, if the load, i.e., the air flow moves in the lowermost range and vice versa. In this case, the minimum air flow, i.e., during idling, represents the lower regeneration threshold of the air flow for the range of the highest load, and the upper limit of the first range of the air flow above idling represents the upper regeneration threshold of the air flow for a range of the highest load.

The method for determining the start of regeneration may be carried out in particular by the control unit evaluating the data of the exhaust gas temperature sensor, of the air flow sensor and of the differential pressure sensor. When the load value from the characteristic maps is in the range between the lower regeneration threshold and the upper regeneration threshold, a check is preferably performed to see whether the currently measured air flow rate is in the range, which was allocated to the load range as described, in which the currently established load value is located. If this is the case, regeneration is started. It is understood that mean values over e.g., 5 seconds can always also be used for the individual values of the sensors.

The invention also includes a device for determining the additive metering and/or a starting time of a regeneration process and for regeneration of a particle filter activated in the exhaust gas system of an internal combustion engine, in particular of a diesel engine, comprising an air flow sensor, which is arranged in terms of flow in the intake air stream before the particle filter, in particular between the intake air filter and engine, an exhaust gas temperature sensor before the particle filter of a differential pressure sensor unit, which determines the pressure difference before and after the particle filter and a control unit, which has data connections for the data relating to air flow, exhaust gas temperature, differential pressure and maintenance. The device also preferably comprises power electronics, which are separate from the control unit, for regulating the heat source for the particle filter, which power electronics can be activated by the control unit. By separating the power electronics and the control unit, it is possible to reduce the influence of the control unit that stems from high energy for the heat source, e.g., from the high temperature generated in the process. To detect the temperature, preferably only the exhaust gas temperature sensor is provided before the particle filter. This reduces the complexity of the system, which is of significance for retrofitting solutions in particular. The device is used preferably for carrying out a method according to the invention and is particularly suitable for this.

In one embodiment, the power electronics comprise a monitoring unit for the current flow and the monitoring unit can report the current flow back to the control unit. This makes it possible to ensure that the regeneration process has also truly started. This is important e.g., in a fault analysis.

One advantage of the invention is the independent nature of the application and thus the applicability for retrofitting applications and original equipment applications, in particular in the case of a high level of variant diversity. The system can be installed independent of knowledge about the engine and obtains the only essential information (air flow signal during idling and at high load) during installation.

By eliminating a tank sensor, which is used to determine the tank content and therefore for metering the additive in the tank, the corresponding mounting is eliminated.

A routine is preferably run through during installation, during which the control unit learns two or more air flow signals specifically for the application. One value is e.g., the idling signal and a second value is at the highest possible rpm and load without a precise value being specified in the process. The gradient determined here in the air flow signal subsequently permits a rough estimate of the current load state. Knowledge of the load state is a crucial aid in deciding whether or not it is a favorable point in time for a regeneration. In this case, the prior art provides for an rpm measurement which is not learned as a function of the vehicle. The rpm is very inadequate information about the load state of an engine especially in the case of turbocharged engines.

The result of the aforementioned advantage is that the cable for the rpm signal does not need to be attached.

The differential pressure sensor unit can also be constructed of two pressure sensors, from which a differential pressure is determined in the control unit.

To optimize the regeneration, it is furthermore possible for an additive metering system to be provided in a design of the method and devices and systems according to the invention. This preferably comprises an additive tank and a metering pump for the additive, which is able to meter the additive for example into the fuel return line such that the additive reaches the fuel tank and can be conveyed to the diesel engine together with the fuel via the fuel supply line. A module with a filling level sensor and/or filling level display can be provided for the filling level of the fuel tank. An additive that facilitates the regeneration of the diesel particulate filter is advantageously used. This may be a catalytic solution, for example, i.e., metal-based, in particular containing iron, iron compounds such as $Fe2O3$, platinum or other metal catalysts.

DETAILED DESCRIPTION

Figure 1:
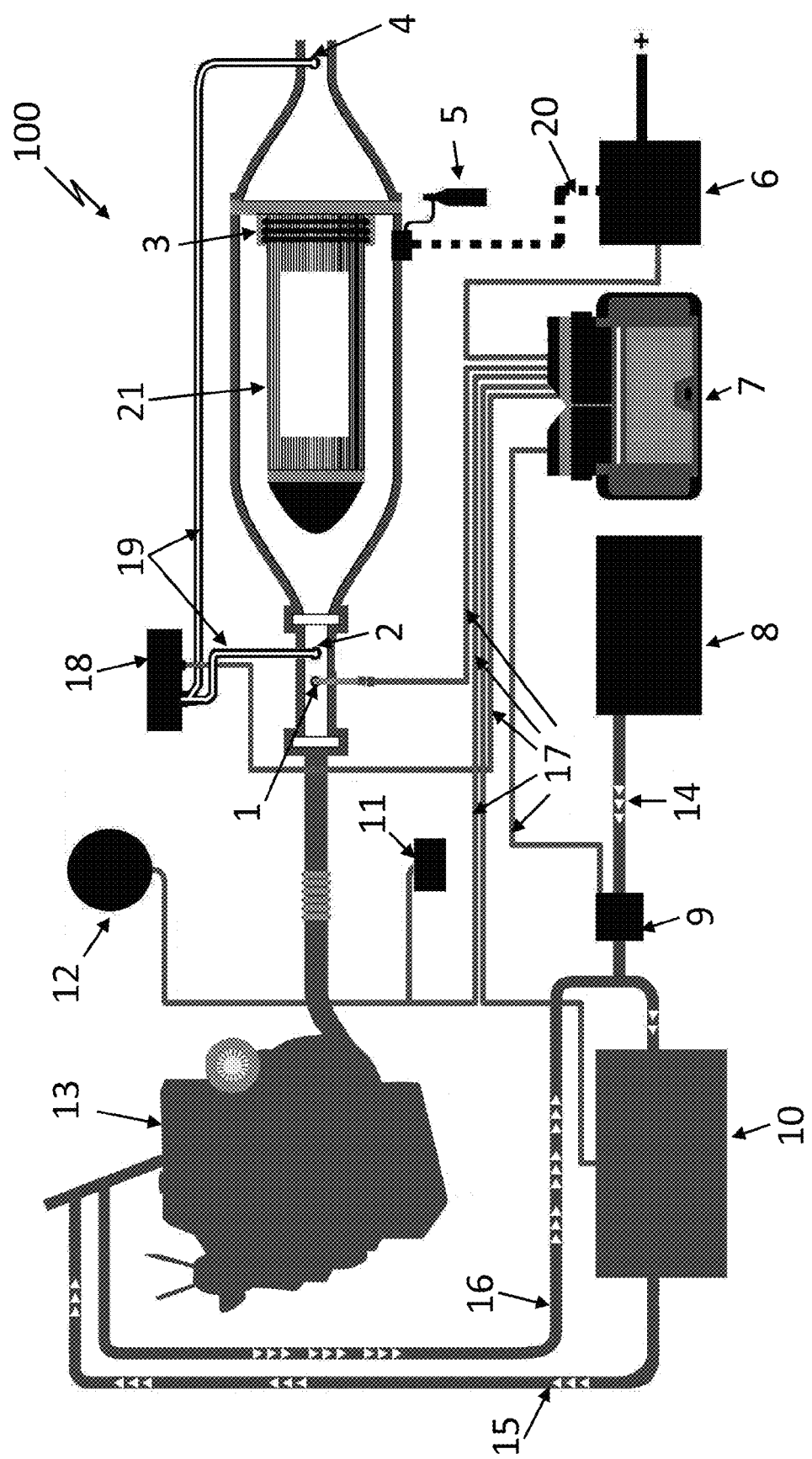
FIG. 1 depicts a diesel particulate filter system having the components of a regeneration system and FIG. 2 shows an example of a load characteristic map of a diesel particulate filter.

FIG. 1 depicts a typical diesel particulate filter system 100. The positions 2 and 4 show pressure measuring points before and after the diesel particulate filter. The differential pressure sensor 18 is connected to the pressure measuring points 2, 4 via differential pressure measurement lines 19. The pressure drop over the diesel particulate filter 21 can be determined at the pressure measuring points. The depicted diesel particulate filter 21 is a sintered metal filter; other filter element technologies are likewise possible, e.g., ceramic filter elements made of silicon carbide, aluminum titanate or cordierite-based ceramics. A heat source 3, e.g., a heater, is attached in or on the diesel particulate filter. This can be a resistance heater. The heater 3 current is controlled or regulated by power electronics 6, in particular by a power relay. The power electronics 6 are designed to be separate from the electronic control unit 7 and are connected therewith via one of the control lines 17. The control unit 7 provides the current target value to the power electronics 6. The power electronics can comprise a monitoring unit, which reports the value of the current strength back to the control unit. The device for regeneration comprises a temperature sensor 1. This may be e.g., a thermal element. The temperature sensor 1 is connected to the control unit 7 via the control lines 17. An air flow sensor 11 is likewise connected to the control unit 7 via a control line 17. Energy is supplied to the heater 3 via a power supply 20, and the heater 3 is also connected to the vehicle mass. Furthermore, an additive tank 8 and a metering pump 9 may be provided for the additive, which is able to meter the additive into the fuel return line 16 such that the additive reaches the fuel tank 10 and can be conveyed to the diesel engine 13 together with the fuel via the fuel supply line 15. A module 12 with a filling level sensor and/or filling level display can be provided for the filling level of the fuel tank. An additive that facilitates the regeneration of the diesel particulate filter is advantageously used. This may be a catalytic solution, for example, i.e., metal-based, in particular containing iron, iron compounds such as $Fe2O3$, platinum or other metal catalysts.

Figure 2:
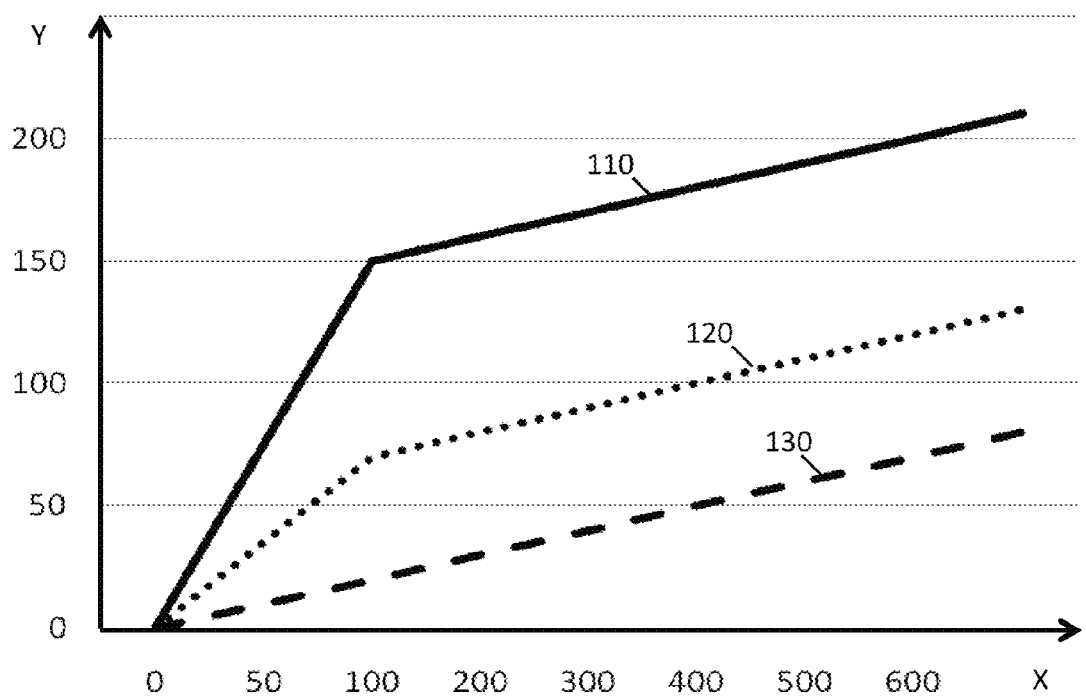

FIG. 2 provides an example of a load characteristic map for the diesel particulate filter. The exhaust gas volume flow in $m^3/h$ is plotted on the x-axis, and the exhaust gas backpressure in mbar on the y-axis. Curves are shown for the exhaust gas backpressure as a function of the exhaust gas volume flow. The first curve 110 shows the condition for no load (0 $g/m^2$), the second curve 120 for a load (here e.g., 24 $g/m^2$) starting at which a regeneration can be conducted meaningfully, and the third curve 130 for a load (here e.g., 36 $g/m^2$) starting at which regeneration should no longer be conducted in order to keep from endangering the diesel particulate filter from too high a temperature during regeneration.

Characteristic maps for the relationship between the exhaust gas temperature, air flow and differential pressure in the three load states of a) no load, b) lower threshold for regeneration and c) upper threshold for regeneration, are stored for a diesel particulate filter as a function of its geometry and size. No information about the internal combustion engine is required for these data.

Adapted to the internal combustion engine, the relationship between the air flow and load is determined. To do this, the air flow during idling is measured as well as the air flow during full load. This can be conducted once for an internal combustion engine type and be stored in the control unit or be performed on the special internal combustion engine when an internal combustion engine is being retrofitted with a diesel particulate filter system with regeneration. The air flow range between idling and full load is then subdivided e.g., into three or four ranges. The range between the lower and upper threshold for the regeneration is correspondingly subdivided into many parts, which are allocated to the ranges of the air flow range. As a result, a load value of the diesel particulate filter starting at which a regeneration can take place is then allocated to a load of the internal combustion engine via the air flow in the case of this load. During full load or higher air flow, the regeneration is also promising at low loads. During idling, a high load is required.

If the system has been prefabricated for particle filter deposition, the method for determining the start of regeneration can be conducted in that the data of the exhaust gas temperature sensor, of the air flow sensor and of the differential pressure sensor are evaluated by the control unit; and when the load value from the characteristic maps is in the range between the lower regeneration threshold and the upper regeneration threshold of the momentary air flow value, regeneration is started. It is understood that mean values over e.g., 5 seconds can always also be used for the individual values of the sensors.

The invention claimed is:

1. A method for metering an additive for a regeneration process of a particle filter activated in the exhaust gas system of an internal combustion engine,
    wherein a quantity of the additive to be metered into a fuel tank supplying fuel to the internal combustion engine is calculated from a soot production of the internal combustion engine;
    wherein a level of success of a regeneration cycle is determined by comparing differential pressure loss prior to regeneration from an inlet to an outlet of the particle filter with a differential pressure loss after regeneration from the inlet to the outlet of the particle filter;
    wherein the level of success of the regeneration cycle of the particle filter is compared to a predetermined target level of success level of success to determine a quantity of the additive to be metered in into the fuel tank;
    wherein once a target level of success is achieved, the concentration of the additive in the fuel tank is sufficient and no additional additive is metered into the fuel tank.

2. The method according to claim 1, wherein the level of success of a regeneration cycle is determined by the steps of:
    before starting the regeneration cycle, measuring a first differential pressure across the particle filter;
    starting the regeneration cycle;
    ending the regeneration cycle;
    measuring a second differential pressure across the particle filter at the completion of the regeneration cycle; and
    comparing the first differential pressure to the second differential pressure to calculate the level of success of completed regeneration cycle;
    if the level of success is less than the target level of success, then
        determining quantity of additive to be metered into the fuel tank for next regeneration cycle from the level of success of the completed regeneration cycle and metering the determined quantity of additive into the fuel tank.

3. The method according to claim 2, wherein
    the claim 2 steps of "if the level of success is less than the target level of success, then determining quantity of additive to be metered into the fuel tank for next regeneration cycle from the level of success of the completed regeneration cycle and metering the determined quantity of additive into the fuel tank" are repeated so long following successive regeneration processes until a predetermined target level of success has been achieved.

4. The method according to claim 2, wherein soot production of the internal combustion engine is calculated from a filter load.

5. The method according to claim 4, wherein the filter load is calculated from measurement data of an engine intake air flow sensor and a differential pressure sensor with the aid of characteristic maps.

6. The method according to claim 5, wherein
    to determine a starting time of the regeneration process of the particle filter activated in the exhaust gas system of an internal combustion engine, sensor measurement data are provided to a control unit, the sensor measurement data including:
        measurement data of an air flow sensor,
        measurement data of an exhaust gas temperature sensor, and
        measurement data of the differential pressure sensor,
    wherein the control unit starts the regeneration on the basis of the sensor measurement data by comparing said sensor measurement data with characteristic maps.

7. The method according to claim 6, wherein a characteristic map allocates to engine intake air flow of a load state of the particle filter, starting at which the particle filter can be regenerated.

8. The method according to claim 6, wherein a value of the load state is allocated to a combination of air flow, exhaust gas temperature and differential pressure.

9. The method according to claim 6, wherein operation of the internal combustion engine operation is detected via an air flow signal.

10. A method for metering an additive for a regeneration process of a particle filter activated in the exhaust gas system of an internal combustion engine,
    wherein the quantity of the additive to be metered in is calculated from the soot production of the internal combustion engine;
    wherein a level of success of a regeneration cycle is determined by comparing differential pressure loss prior to regeneration from an inlet to an outlet of the particle filter with a differential pressure loss after regeneration from the inlet to the outlet of the particle filter;
    wherein the level of success of the regeneration cycle of the particle filter is used to determine a quantity of the additive to be metered in;
    wherein the level of success of a regeneration cycle is determined by
        before starting the regeneration cycle, measuring a first differential pressure across the particle filter;
        starting the regeneration cycle;
        ending the regeneration cycle;
        measuring a second differential pressure across the particle filter at the completion of the regeneration cycle; and comparing the first differential pressure to the second differential pressure to calculate the level of success of completed regeneration cycle;

determining quantity of additive to be metered in for next regeneration cycle from the level of success of the completed regeneration cycle;

wherein soot production of the internal combustion engine is calculated from a filter load;

wherein the filter load is calculated from measurement data of an air flow sensor and a differential pressure sensor with the aid of characteristic maps;

wherein to determine a starting time of the regeneration process of the particle filter activated in the exhaust gas system of an internal combustion engine, the measurement data of an air flow sensor, measurement data of an exhaust gas temperature sensor, and the measurement data of the differential pressure sensor are provided to a control unit and the control unit starts the regeneration on the basis of the sensor measurement data by comparing said measurement data with characteristic maps;

wherein the characteristic maps provide relationship between exhaust gas temperature, air flow rate and the differential pressure across the particle filter at each of three soot load states: an unloaded state, a lower soot threshold and an upper soot load regeneration threshold, the soot load thresholds of the particle filter based upon geometry and size of the particle filter, the soot load thresholds consisting of:

an unloaded soot load threshold in $g/m^2$, representing a soot load of the particle filter with no soot in its filtration surface area and defining an unloaded state of the particle filter;

a lower soot load threshold defining a lower threshold for regeneration state of the particle filter;

wherein the lower soot load threshold is the smallest soot load in $g/m^2$ at which soot particles in the particle filter burn off completely during regeneration;

an upper soot load regeneration threshold;

wherein the upper soot load regeneration threshold is the soot load in $g/m^2$ above which regeneration is not to be carried out to prevent endangering the particle filter from too high a temperature during regeneration;

wherein the three soot load limits are determined as a function of geometry and size of the particle filter alone without requiring information on the internal combustion engine.

\* \* \* \* \*